US006704487B2

(12) United States Patent
Parhami et al.

(10) Patent No.: US 6,704,487 B2
(45) Date of Patent: Mar. 9, 2004

(54) METHOD AND SYSTEM FOR REDUCING DN/DT BIREFRINGENCE IN A THERMO-OPTIC PLC DEVICE

(75) Inventors: Farnaz Parhami, Fremont, CA (US); Alice Liu, San Jose, CA (US); Pamela S. Trammel, San Jose, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 09/927,256

(22) Filed: Aug. 10, 2001

(65) Prior Publication Data

US 2003/0031445 A1 Feb. 13, 2003

(51) Int. Cl.[7] .............................................. G02B 6/10
(52) U.S. Cl. ..................................................... 385/129
(58) Field of Search ................................ 385/129, 130, 385/131, 132, 147, 2, 3, 8, 16

(56) References Cited

U.S. PATENT DOCUMENTS

| 6,240,226 B1 | * | 5/2001 | Presby et al. | 385/42 |
| 6,278,168 B1 | * | 8/2001 | Day | 257/431 |
| 6,310,999 B1 | * | 10/2001 | Marcuse et al. | 385/42 |
| 6,424,755 B1 | * | 7/2002 | Clapp | 385/3 |
| 6,434,318 B1 | * | 8/2002 | Bischel et al. | 385/140 |

OTHER PUBLICATIONS

Yaffe, et al.; Polarization–Independent silica–on–silicon machzehnder interferometers; 1994; Journal of Lightwave Technology.

Okuno, et al.; Birefringence Control of Silica Waveguides on SI and its application to a Polarization–Beam Splitter/Switch; 1994; Journal of Lightwave Technology.

Nadler, et al.; Polarisation Insensitive Wavelength multiplexers using Stress Release Grooves; 1998; Swiss Federal Institute of Technology.

* cited by examiner

Primary Examiner—Tulsidas Patel

(57) ABSTRACT

A method of making an optical waveguide structure for an active PLC device having a reduced dn/dt birefringence. The method includes the step of forming a waveguide core layer on a bottom cladding, the waveguide core layer having a higher refractive index than the bottom cladding. The waveguide core layer is then etched to define a waveguide core. A top cladding is subsequently formed over the waveguide core and the bottom cladding. The top cladding also has a lower refractive index than the waveguide core. The top cladding is then etched to define a first trench and a second trench parallel to the waveguide core. The first trench and the second trench are configured to relieve a stress on the waveguide core. This stress can be induced by a heater, as in a case where the active PLC is a thermo-optic PLC. The first trench and the second trench can extend from an upper surface of the top cladding to an upper surface of the bottom cladding. The first trench and the second trench can extend from the upper surface of the top cladding into a portion of the underlying substrate. The first trench and the second trench are configured to balance a tensile stress within the waveguide core. A cap can be formed over the waveguide core prior to forming the top cladding to further balance the tensile stress within the waveguide core. The bottom cladding can have a higher dopant concentration than the top cladding.

17 Claims, 10 Drawing Sheets

METHOD AND SYSTEM FOR REDUCING DN/DT BIREFRINGENCE IN A THERMO-OPTIC PLC DEVICE

FIELD OF THE INVENTION

The present invention relates generally to planar lightwave circuits. More particularly, the present invention relates to a method and system for a reduced polarization dependent wavelength shift/polarization dependent loss of planar lightwave circuit.

BACKGROUND OF THE INVENTION

Planar lightwave circuits comprise fundamental building blocks for the newly emerging, modern fiberoptic communications infrastructure. Planar lightwave circuits are innovative devices configured to transmit light in a manner analogous to the transmission of electrical currents in printed circuit boards and integrated circuit devices. Examples include arrayed waveguide grating devices, integrated wavelength multiplexers/demultiplexers, optical switches, optical modulators, wavelength-independent optical couplers, and the like.

Planar lightwave circuits (PLCs) generally involve the provisioning of a series of embedded optical waveguides upon a semiconductor substrate (e.g., silicon), with the optical waveguides fabricated from one or more silica glass substrate layers, formed on an underlying semiconductor substrate. Fabrication techniques required for manufacturing PLCs using silica glass substrates is a newly emerging field. Electronic integrated circuit type (e.g., CMOS) semiconductor manufacturing techniques have been extensively developed to aggressively address the increasing need for integration in, for example, the computer industry. This technology base is currently being used to make PLCs. By using manufacturing techniques closely related to those employed for silicon integrated circuits, a variety of optical circuit elements can be placed and interconnected on the surface of a silicon wafer or similar substrate. This technology has only recently emerged and is advancing rapidly with leverage from more mature tools of the semiconductor-processing industry.

PLCs are constructed with a number of waveguides precisely fabricated and laid out across a silicon wafer. A conventional optical waveguide comprises an un-doped silica bottom clad layer, with at least one waveguide core formed thereon, and a cladding layer covering the waveguide core, wherein a certain amount of at least one dopant is added to both the waveguide core and the cladding layer so that the refractive index of the waveguide core is higher than that of the cladding layer. Fabrication of conventional optical waveguides involves the formation of a silica layer as the bottom clad (BC), usually grown by thermal oxidation upon a silicon semiconductor wafer. The core layer is a doped silica layer, which is deposited by either plasma-enhanced chemical vapor deposition (PECVD) or flame hydrolysis deposition (FHD). An annealing procedure then is applied to this core layer (heated above 1000 C.). The waveguide pattern is subsequently defined by photolithography on the core layer, and reactive ion etching (RIE) is used to remove the excess doped silica to form one or more waveguide cores. A top cladding layer is then formed through a subsequent deposition process. Finally, the wafer is cut into multiple PLC dies and packaged according to their particular applications.

A well-known problem with many PLCs is the polarization sensitivity of the device. Polarization sensitivity is a problem for both active PLC devices and passive PLC devices. For example, with arrayed waveguide grating (AWG) devices, integrated wavelength multiplexers/demultiplexers, and the like, due to the fact that an optical signal propagating through an optical fiber has an indeterminate polarization state, must be substantially polarization insensitive. However, due to stress imposed upon a silica substrates (e.g., from the fabrication process) and other factors, planar waveguides usually have different propagation constants for TE (transverse electric) and TM (transverse magnetic) propagation modes.

Polarization sensitivity is even more problematic with active PLC devices, particularly thermo-optic PLC devices where thermally induced birefringence exists in addition to any "intrinsic" birefringence of the PLC waveguides. PLC based thermo-optic devices utilize silica waveguides which exhibit the "thermo-optic effect", wherein their refractive indices (e.g., the core refractive index) change as the temperature is changed. These thermo-optic effect based devices have been used in a variety of systems, such as, for example, optical switches, variable optical attenuators (VOAs), dynamic gain flattening filters (DGFF), and integrated devices such as a VMUX (VOA plus MUX) which require electrical circuits to activate the device.

Prior art FIG. 1 shows a diagram of a Mach-Zehnder thermo-optic switch. As depicted in FIG. 1, a first waveguide (core 10a) and a second waveguide (core 10b) are used to implement input ports (e.g., Pin1 and Pin2) and output ports (e.g., Pout1 and Pout2) as shown. The first and second waveguides pass through a first coupling region 21 and a second coupling region 22. A resistive thin film heater is deposited above each waveguide between the two coupling regions 21–22 (e.g., heater1 and heater2).

The heaters are used to selectively heat one waveguide core in order to change its refractive index, and thereby modulate an accumulated phase difference of light propagating through the two waveguide cores 10a–b. When light is launched into one of the input ports, it is split into the two cores 10a–b by the first coupler 21 with equal optical power and $\pi/2$ phase difference. As light travels through the waveguide cores 10a–b, the phase difference can be altered using a temperature difference between the two cores, as controlled by the two heaters. After passing through the second coupler 22, the two beams recombine either constructively or destructively at either of the two output ports, depending upon the exact phase difference between the two cores 10a–b. The exact phase difference is controlled by precisely controlling the current/voltage applied to the heaters. This modulation of temperature achieves the purpose of switching the light between the two output ports. The same technique can be used in VOA devices and other types of thermo-optic active PLC devices.

There exists a problem, however, in that the thermal stress-induced polarization sensitivity causes birefringence problems within the devices. As described above, the thermo-optic devices rely upon the selective heating of the silica waveguides to modulate the relative refractive index of the waveguides. However, this heat also induces stress (e.g., due to different coefficients of thermal expansion of the core, top clad, bottom clad, etc.) within the silica structure of the waveguides. Thus, waveguides usually have different propagation constants for TE (transverse electric) and TM (transverse magnetic) propagation modes, and the propagation constants vary with the application of power to the heaters (e.g., $p_1$ and $p_2$). This mismatch can cause a polarization dependent loss, wherein either the TE or TM mode is attenuated within the optical waveguide structures to a greater degree than the other, and other types of problems.

Prior art FIG. 2 shows a graph depicting polarization dependent wavelength shift for TE and TM propagation modes. As depicted in FIG. 2, a TE signal component and a TM signal component are graphed after having experienced phase dependent wavelength shift (PDW) due to, for example, thermally induced birefringence. The vertical axis of the graph shows insertion loss in decibels and the horizontal axis shows power (e.g., as applied to the heaters). The difference in propagation constants for the TE and TM signal components results in a PDW wavelength shift in the spectral response peak between the TE and TM signal components. As is known by those skilled in the art, this birefringence is characterized by the expression dn/dt.

Prior art attempts to solve the above described birefringence problem are described by Okuno et al. in "Birefringence Control of Silica Waveguides on Si and Its Application to a Polarization-Beam Splitter/Switch," Journal of Lightwave Technology, Vol. 12, No. 4, April 1994, and by Yaffe et al. in "Polarization-Independent Silica-on-Silicon Mach-Zehnder Interferometers," Journal of Lightwave Technology, Vol. 12, No. 1, January 1994. Okuno approaches waveguide birefringence by depositing one or more amorphous silicon patches on top of the Mach-Zehnder arms of a device and by laser trimming. Yaffe approaches waveguide birefringence by adding $SiN_4$ patches under the Mach-Zehnder arms of a device. In both prior art cases, the intrinsic birefringence of the silica waveguide structure is controlled, not the thermally induced birefringence generated due to phase shifter heater temperature, as in thermo-optic PLC devices. Also, in both prior art cases, additional film deposition steps are required in the fabrication process flow.

Thus what is required is a solution that matches the TE and TM propagation modes of an optical signal within active PLC devices. What is required is a solution that minimizes thermally induced dn/dt birefringence within thermo-optic PLC devices. The present invention provides a novel solution to the above requirements.

SUMMARY OF THE INVENTION

The present invention is a method and system for reducing dn/dt birefringence in a thermo-optic PLC device. The present invention provides a solution that matches the TE and TM propagation modes of an optical signal within active PLC devices. The present invention minimizes thermally induced dn/dt birefringence within thermo-optic PLC devices. Additionally, the present invention does not add additional film deposition steps to the PLC device fabrication process.

In one embodiment, the present invention is implemented as a PLC device fabrication process for making optical waveguide structures for thermo-optic PLC devices having a reduced dn/dt birefringence. The process includes the step of forming a waveguide core layer on a bottom cladding, the waveguide core layer having a higher refractive index than the bottom cladding. The waveguide core layer is then etched to define a waveguide core. A top cladding is subsequently formed over the waveguide core and the bottom cladding. The top cladding also has a lower refractive index than the waveguide core. The top cladding is then etched to define a first trench and a second trench parallel to the waveguide core. The first trench and the second trench are configured to relieve a stress on the waveguide core. This stress can be induced by a heater, as in a case where the active PLC is a thermo-optic PLC.

Depending upon the specific requirements of a device, the first trench and the second trench can extend from the upper surface of the top cladding to the upper surface of the bottom cladding, or deeper. For example, in a Mach-Zehnder switch application, the first trench and the second trench can extend from the upper surface of the top cladding into a portion of the underlying substrate.

The first trench and the second trench are configured to balance a stress within the waveguide core. Both tensile stresses and compressive stresses exist within the waveguide structure due to the thermal expansion characteristics of the top and bottom cladding and the waveguide core. The first and second trenches balance the stresses by allowing the top cladding to more readily expand. A cap can be formed over the waveguide core prior to forming the top cladding to further balance the stress within the waveguide core. Additionally, the bottom cladding can have a higher dopant concentration than the top cladding to further balance the tensile stress within the waveguide core.

BRIEF DESCRIPTION OF THE DRAWINGS

The present invention is illustrated by way of example and not by way of limitation, in the Figures of the accompanying drawings and in which like reference numerals refer to similar elements and in which.

Prior art

Prior art

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Embodiments of the present invention are directed towards a method and system for reducing dn/dt birefringence in a thermo-optic PLC device using stress relief trenches on either side of the waveguide core of the PLC device, parallel to the waveguide core. The present invention provides a solution that matches the TE and TM propagation modes of an optical signal within active PLC devices. The present invention minimizes thermally induced dn/dt birefringence within thermo-optic PLC devices. Additionally, the present invention does not add additional film deposition steps to the PLC device fabrication process. The present invention and its benefits are further described below.

Figure 1:
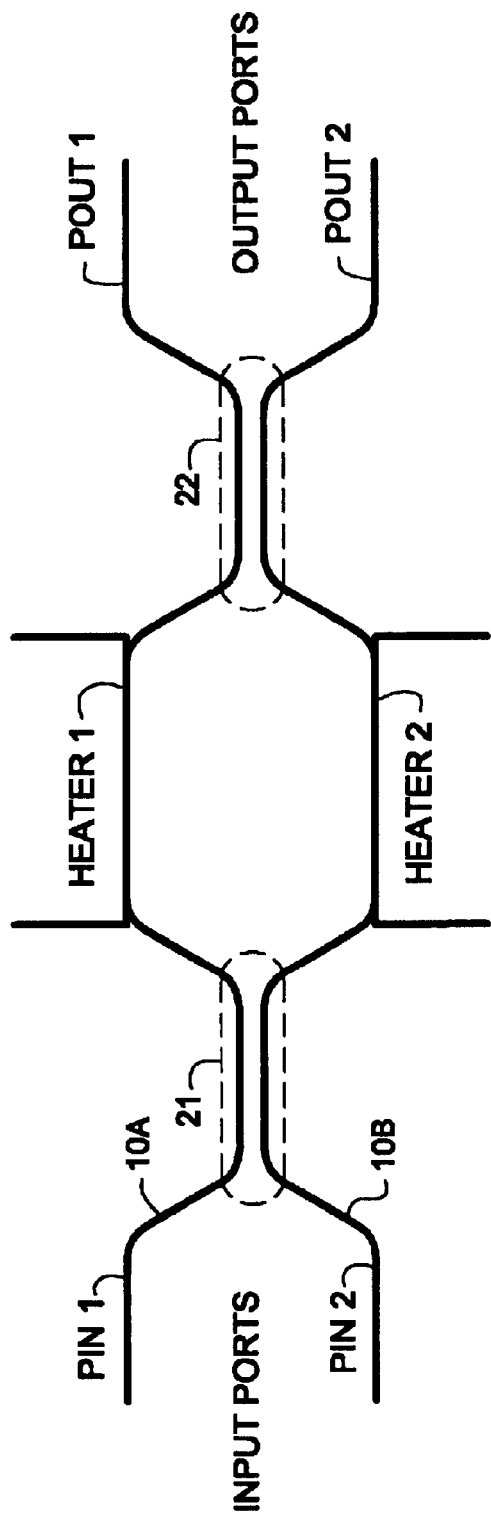
FIG. 1 shows a top-down view of a prior art Mach-Zehnder thermo-optic PLC.
Figure 2:
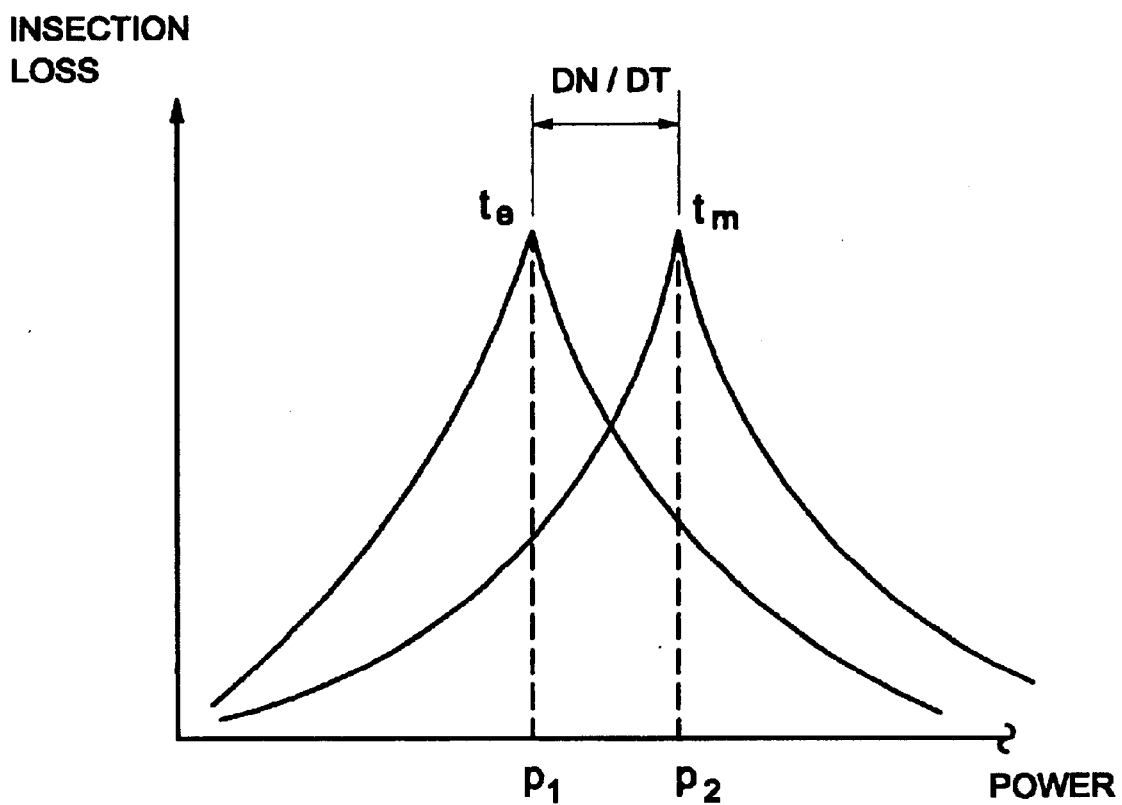
FIG. 2 shows a graph of Insertion Loss vs. Power (or Phase or voltage squared).
Figure 3:
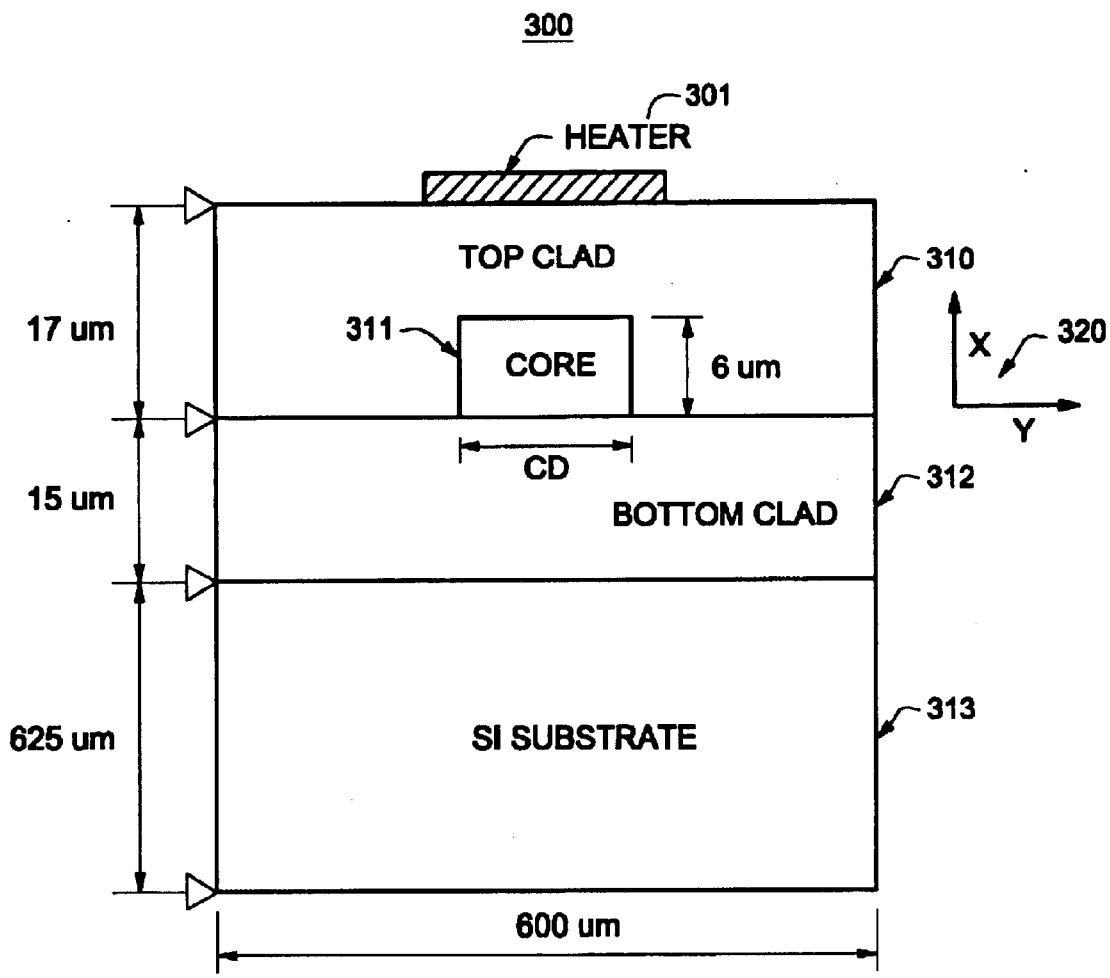
FIG. 3 shows a cross-section view of an optical waveguide structure for an active thermo-optic PLC device.

FIG. 3 shows a cross-section view of an active optical waveguide structure 300. As depicted in FIG. 3, the active optical waveguide structure 300, hereafter PLC 300, includes a heater 301 formed over an underlying top clad 310 and waveguide core 311. The top clad 310 and core 311 are formed over a bottom clad 312 and an underlying silicon substrate 313.

The major steps of silicon oxide deposition, photolithography, and fabrication are well known and widely used in PLC fabrication. Accordingly, such steps will not be described in extensive detail. Additionally, it should be noted that FIGS. 3–6 are intended to be schematic to illustrate the principles of the present invention. As such, the dimensions depicted maybe exaggerated in order to illustrate aspects of the embodiments.

In fabricating PLC 300, a bottom clad 312 is deposited over substrate 313. An optical core layer is subsequently deposited over the bottom clad 312 wherein the optical core layer has a higher refractive index than bottom clad 312. Bottom clad 312 can be a doped $SiO_2$ layer formed over substrate 313. The optical core layer can be a doped $SiO_2$ glass layer having a higher refractive index than the top clad 310 and the bottom clad 312, as is known in the art. The optical core layer is then patterned, using well-known photolithography techniques, and etched to define the core 311, having the critical dimension "CD" as shown. The top clad 310 is then deposited. Top clad 310 can be a doped $SiO_2$ layer in the same manner as bottom clad 312. A thin film heater layer is then deposited, patterned, and etched to form heater 301. As shown in FIG. 3, the substrate is typically 625 microns thick or greater, the bottom clad 15 microns thick, and the top clad 17 microns thick. The cross-section shown in FIG. 3 is approximately 600 microns wide.

Heater 301 is used to selectively heat core 311 in order to change its refractive index, and thereby modulate the phase of light propagating through the core 311. The exact phase is controlled by precisely controlling the current/voltage applied to heater 301. The modulation of phase relationships of light propagation through multiple waveguide cores (e.g., core 311) is used in a variety of active PLC devices, such as, for example, optical switches, VOA devices, and the like.

Referring still FIG. 3, birefringence can be very problematic with active PLC devices. Thermally induced birefringence due to the operation of heater 301 exists in addition to any intrinsic birefringence of PLC 300.

Embodiments of the present invention take advantage of the fact that stress imbalance (in x and y directions as shown by graph 320) within core 311 that is generated due to heater temperature is the source of dn/dt birefringence. Stress in the y direction is generally tensile due to the fact that top clad 310 tends to expand more than core 311. This is due to the fact that top clad 310 has a higher CTE (coefficient of thermal expansion) than core 311. Stress in the x direction is generally compressive since the expansion of the top clad material directly beneath heater 301 is constrained in the x direction by the top clad material where the heat from heater 301 does not reach. This stress imbalance causes the thermally induced dn/dt birefringence.

The stress in both the x direction and the y direction for the different portions of waveguide structures can be analyzed through both empirical measurement and simulation. The results of such analysis have been used in devising the embodiments of the present invention. Additional descriptions regarding calculations and simulations for analyzing stress within optical waveguide structures can be found in "Fundamentals of Optical Waveguides" ISBN 0-12-525095-9, which is incorporated herein.

Figure 4:
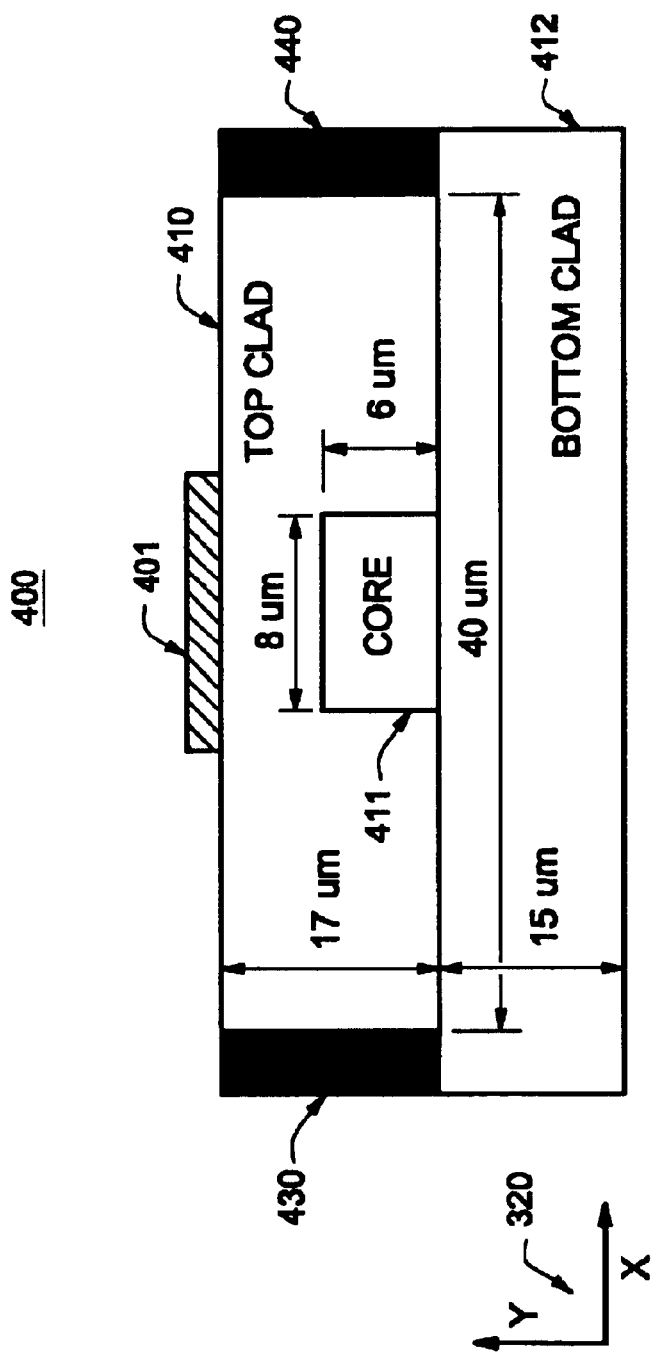
FIG. 4 shows a cross-section view of an optical waveguide structure in accordance with one embodiment of the present invention having first and second trenches etched from the top clad surface to the bottom clad surface.
Figure 5:
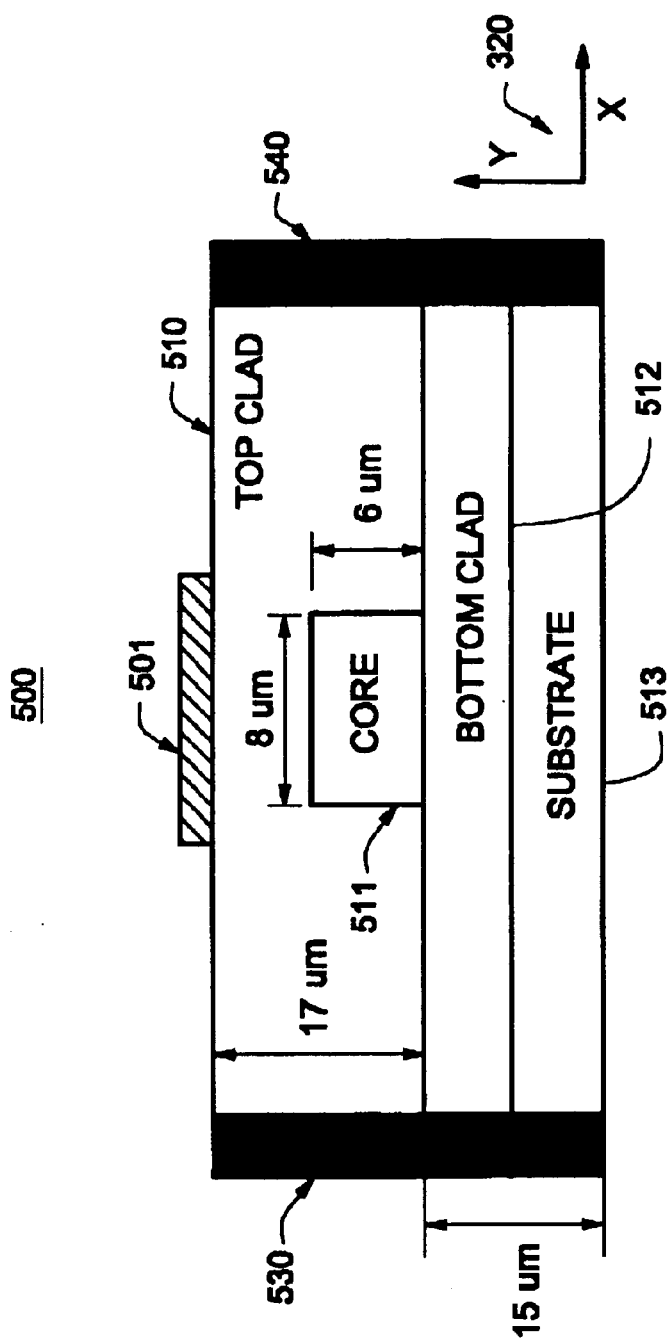
FIG. 5 shows a cross-section view of an optical waveguide structure in accordance with one embodiment of the present invention having first and second trenches etched from the top clad surface, through the bottom clad, and into a portion of the substrate.
Figure 6:
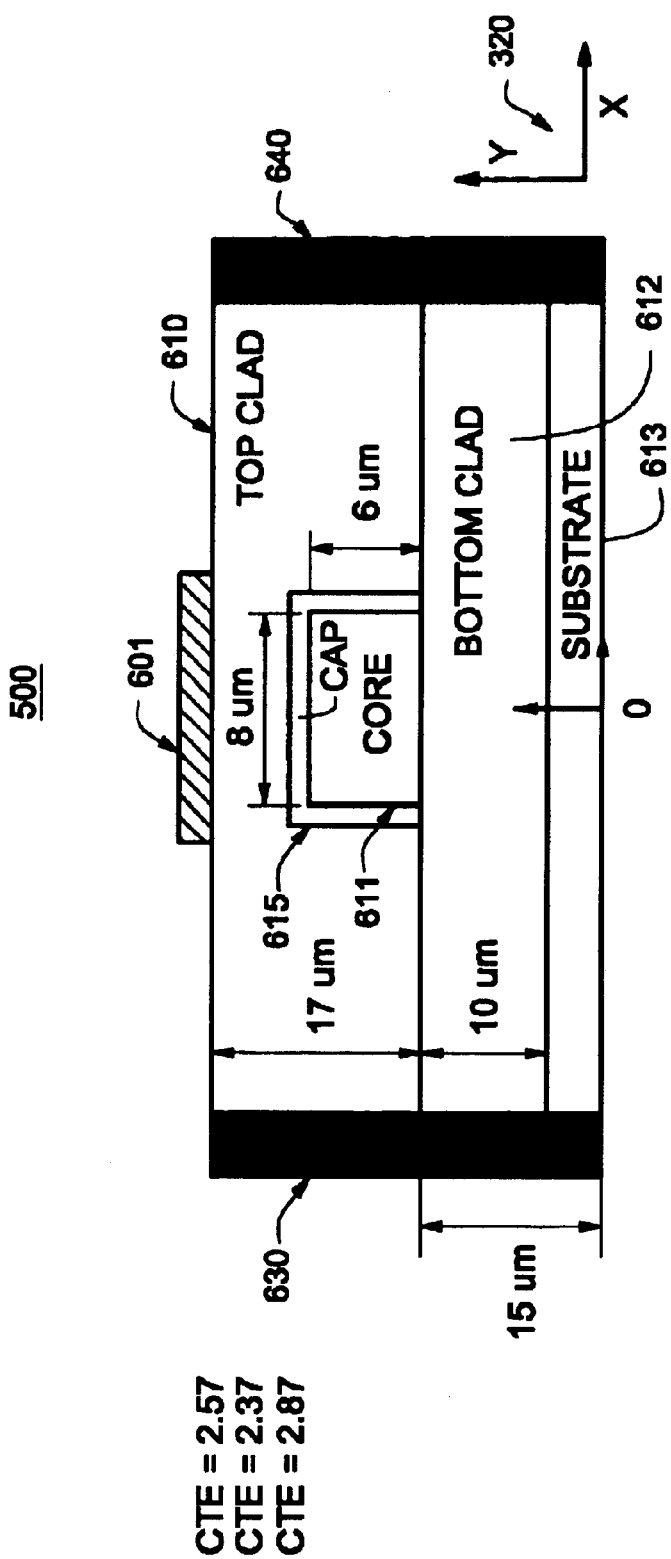
FIG. 6 shows a cross-section view of an optical waveguide structure in accordance with one embodiment of the present invention having first and second trenches etched from the top clad surface, through the bottom clad, and into a portion of the substrate, in conjunction with a cap for the optical core.

The present invention solves this thermal induced birefringence problem by using a process for a highly doped bottom clad and the introduction of two deep trenches, as depicted, to allow the expansion of the cladding material in the x direction. Therefore, a tensile stress in the x direction is generated in core 311 that balances the tensile stress in the y direction and eliminates the thermally induced birefringence. FIGS. 4–6 below show three embodiments of a PLC device in accordance with the present invention. It should be noted that the dimension depicted in FIGS. 4–6 are exemplary, and as such, are not intended to limit the invention to the dimensions shown.

FIG. 4 shows a cross-section view of a PLC 400 in accordance with one embodiment of the present invention. As depicted in FIG. 4, PLC 400 includes a first trench 430 and a second trench 440 etched on either side of a core 411, parallel to core 411. In this embodiment, trenches 430–440 extend from the upper surface of top clad 410 to the upper surface of bottom clad 412. The dimensions of PLC 400 are approximately as shown.

FIG. 5 shows a cross-section view of a PLC 500 in accordance with another embodiment of the present invention. As depicted in FIG. 5, PLC 500 includes a first trench 530 and a second trench 540 etched on either side of a core 511, parallel to core 511. In this embodiment, trenches 530–540 extend from the upper surface of top clad 510, through bottom clad 512, and into a portion of substrate 513.

FIG. 6 shows a cross-section view of a PLC 600 in accordance with another embodiment of the present invention. As depicted in FIG. 6, PLC 600 includes a first trench 630 and a second trench 640 etched on either side of a core 611, parallel to core 611. In this embodiment, trenches 630–640 extend from the upper surface of top clad 610, through bottom clad 612, and into a portion of substrate 613.

PLC 600 also includes an additional feature of the present invention. In addition to the deeper trenches 630–640, PLC 600 also includes a cap 615 formed over core 611. In this embodiment, the cap 615 is formed over core 611 prior to deposition of top clad 610. Cap 615 is typically undoped $SiO_2$ (USG). The cap 615 is included to further reduce tensile stress in the y direction. Cap 615 keeps the sidewalls of core 611 from being pulled by the top clad 610 and therefore reduces the y direction tensile stress.

The birefringence characteristics of PLC 300 of FIG. 3, PLC 400 of FIG. 4, PLC 500 of FIG. 5, and PLC 600 of FIG.

6 are now described using the following graphs. As described above, the present invention solves the thermally induced dn/dt birefringence by using a highly doped bottom clad and the introduction of two deep trenches, as depicted in FIGS. 4–6, to allow the expansion of the cladding material in the x direction.

Figure 7:
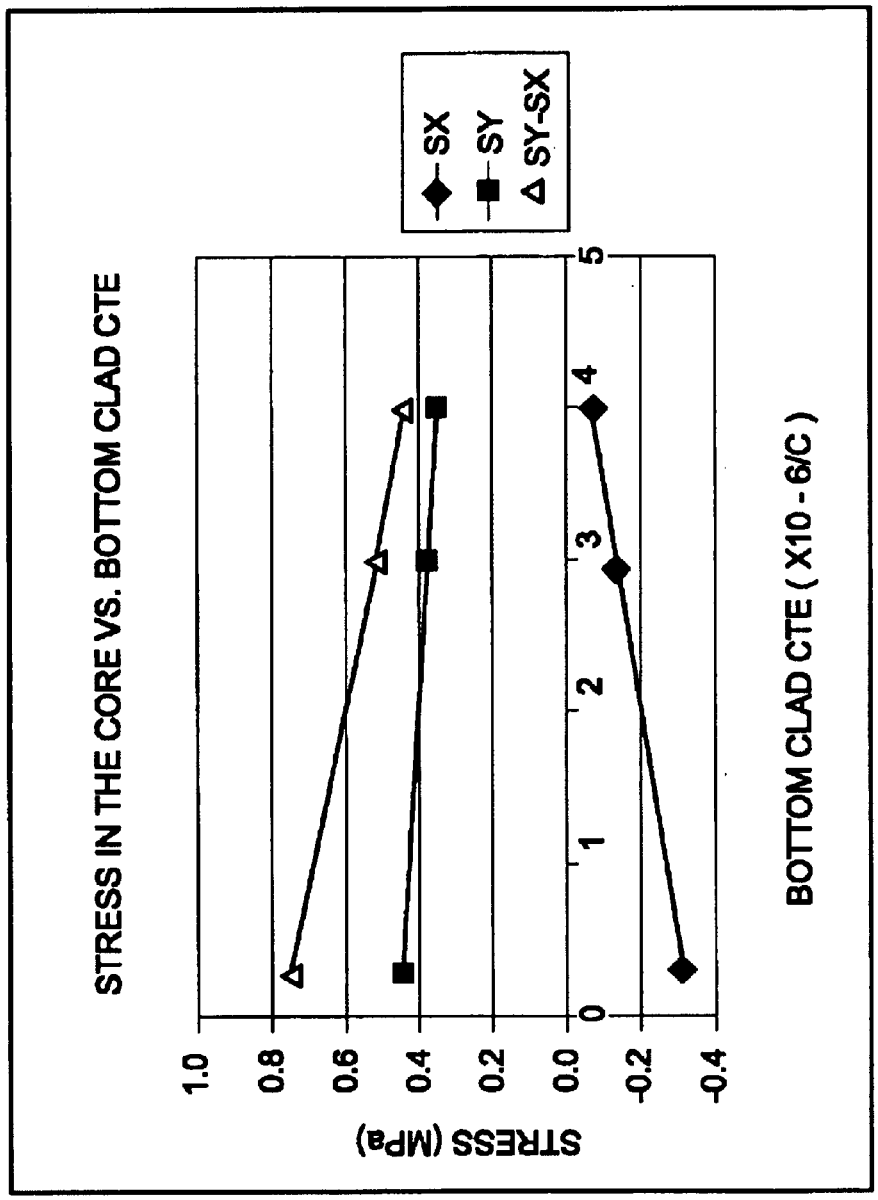
FIG. 7 shows a graph of the stress in a core with respect to the CTE of a bottom clad of a PLC.

FIG. 7 shows a graph of the stress in a core with respect to the CTE of a bottom clad (e.g., PLC 600 of FIG. 6). As can be seen in FIG. 7, the increase in bottom clad CTE results in decrease in compressive stress in the core in x direction. The stress in y direction is almost unchanged. As a result the net effect on the stress in the y direction (Sy) minus the stress in the x direction (Sx), expressed as "Sy-Sx", is less and therefore dn/dt birefringence is smaller. In this manner, a highly doped bottom clad (increasing bottom clad CTE) can improved dn/dt.

Figure 8:
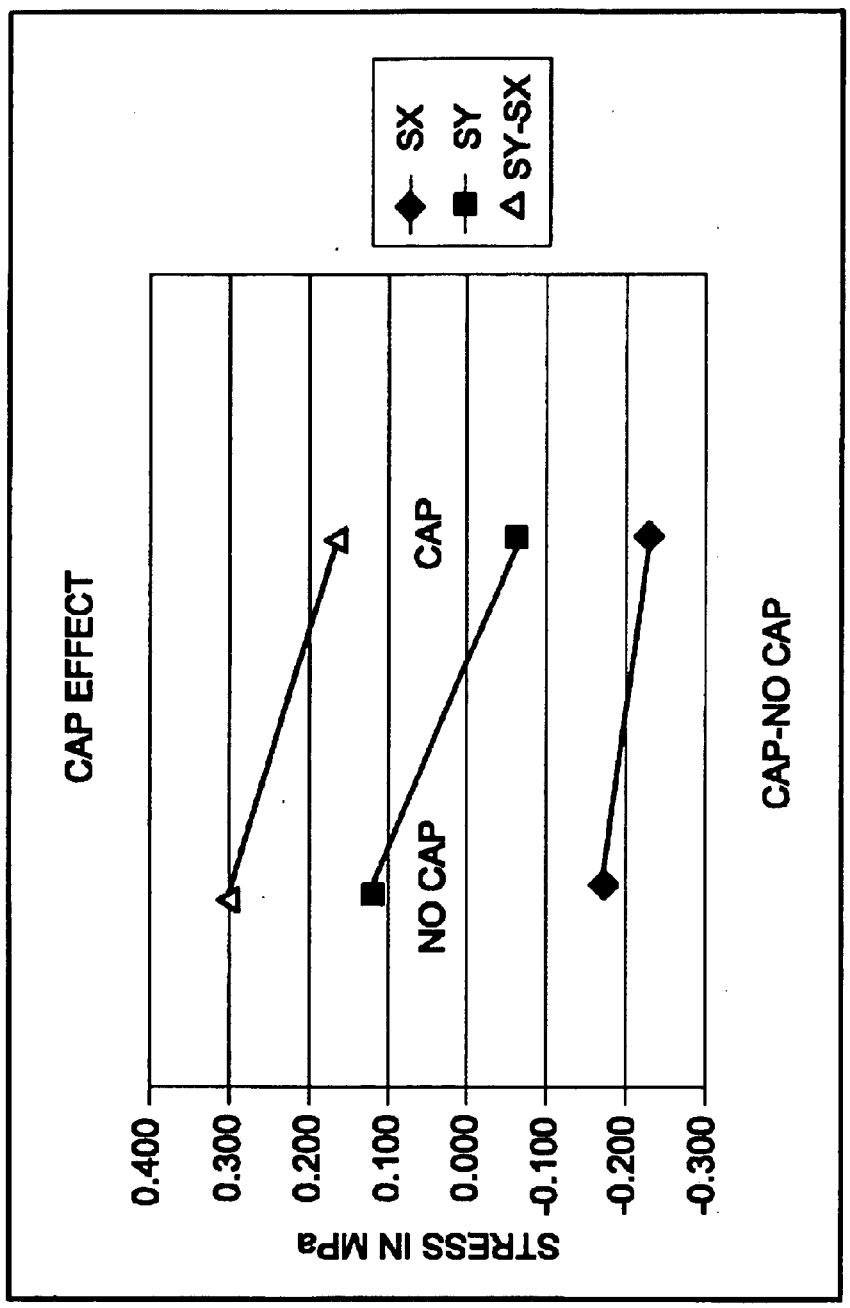
FIG. 8 shows a graph of the effect of a cap, wherein the use of a cap reduces Sy in the core significantly.

FIG. 8 shows a graph of the effect of a cap. The use of a cap (e.g., 615) reduces Sy in the core significantly. Thus, the cap further adds to the net affect of the reduction of Sy-Sx.

Figure 9:
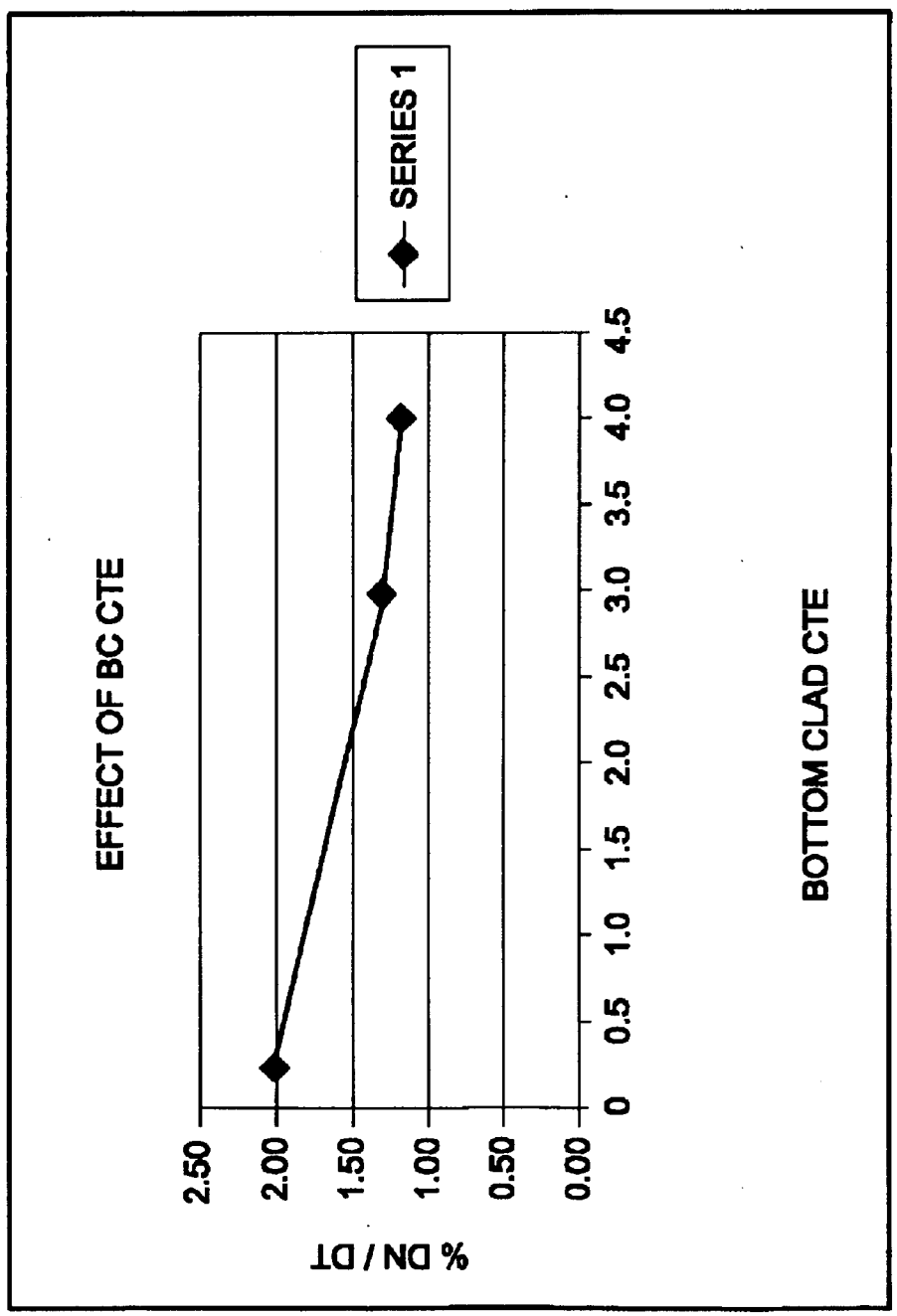
FIG. 9 shows a graph of the dn/dt birefringence with respect to bottom clad CTE.

FIG. 9 shows a graph of the dn/dt birefringence with respect to bottom clad CTE. FIG. 9 shows that increasing the bottom clad CTE significantly reduces dn/dt, as described in FIG. 7 above, by decreasing compressive stress in the x direction.

Figure 10:
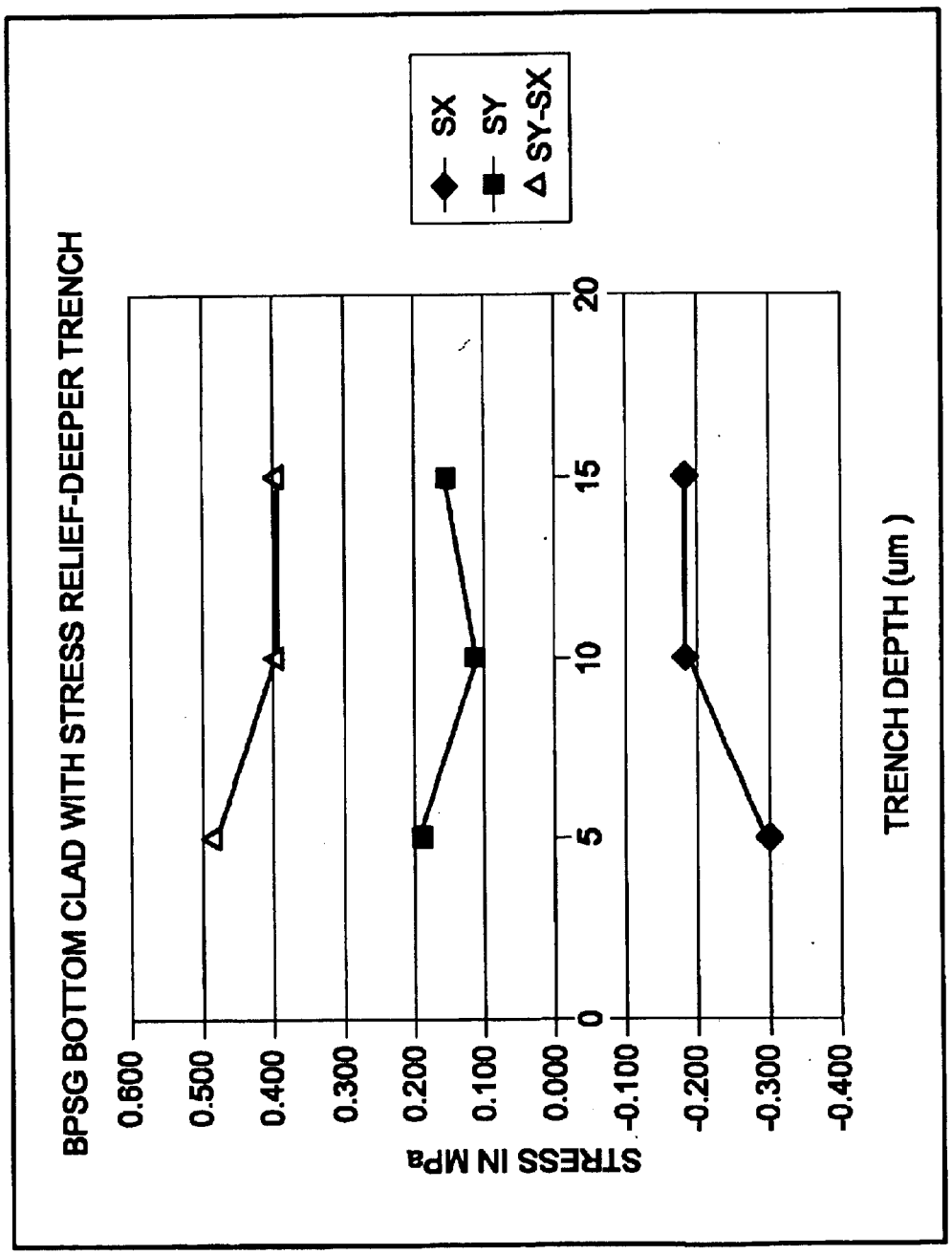
FIG. 10 shows a graph of the effect of stress relief trenches with respect to trench depth.

FIG. 10 shows the effect of stress relieve trenches with respect to trench depth. As depicted, the main effect is on Sx. As trench depth increases, Sx becomes less compressive and therefore Sy-Sx decreases. However, after a certain depth, no additional benefit is obtained by increasing trench depth.

Thus, embodiments of the present invention are directed towards a method and system for reducing dn/dt birefringence in a thermo-optic PLC device using stress relief trenches on either side of the waveguide core of the PLC device, parallel to the waveguide core. The present invention provides a solution that matches the TE and TM propagation modes of an optical signal within active PLC devices. The present invention minimizes thermally induced dn/dt birefringence within thermo-optic PLC devices. Additionally, the present invention does not add additional film deposition steps to the PLC device fabrication process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method of making an optical waveguide structure having a reduced dn/dt birefringence, the method comprising the steps of:
   a) forming an optical core layer on a bottom cladding, the optical core layer having a higher refractive index than the bottom cladding;
   b) etching the optical core layer to define an optical core;
   c) forming a top cladding over the optical core and the bottom cladding, the top cladding having a lower refractive index than the optical core, and wherein the bottom cladding has a higher dopant concentration than the top cladding;
   d) etching the top cladding to define a first trench and a second trench parallel to the optical core, the first trench and the second trench configured to relieve a stress on the optical core.

2. The method of claim 1 wherein the first trench and the second trench extend from an upper surface of the top cladding to an upper surface of the bottom cladding.

3. The method of claim 1 wherein the first trench and the second trench extend from an upper surface of the top cladding to a lower surface of the bottom cladding.

4. The method of claim 1 wherein the first trench and the second trench extend from an upper surface of the top cladding into a portion of a substrate beneath the bottom cladding.

5. The method of claim 1 wherein the optical waveguide structure is an active optical waveguide structure, and wherein the first trench and the second trench are configured to relieve a thermally induced stress on the optical core from a heater.

6. The method of claim 1 wherein the first trench and the second trench are configured to balance a stress within the optical core.

7. The method of claim 1 further including the step of forming a cap for the optical core prior to forming the top cladding.

8. The method of claim 7 wherein the cap is formed from undoped silica glass.

9. A method of making a Mach-Zehnder optical waveguide structure having a reduced dn/dt birefringence, the method comprising the steps of:
   a) forming an optical core layer on a bottom cladding, the optical core layer having a higher refractive index than the bottom cladding;
   b) etching the optical core layer to define an optical core;
   c) forming a cap for the optical core;
   c) forming a top cladding over the optical core and the bottom cladding, the top cladding having a lower refractive index than the optical core;
   d) etching the top cladding to define a first trench and a second trench parallel to the optical core, the first trench and the second trench configured to relieve a stress on the optical core, wherein the first trench and the second trench extend from an upper surface of the top cladding into a portion of a substrate beneath the bottom cladding.

10. The method of claim 9 wherein the first trench and the second trench are configured to relieve a thermally induced stress on the optical core from a heater.

11. The method of claim 9 wherein the first trench and the second trench are configured to balance a stress within the optical core.

12. The method of claim 9 wherein the bottom cladding has a higher dopant concentration than the top cladding.

13. The method of claim 9 wherein the cap for the optical core is formed from undoped silica glass.

14. The method of claim 9 wherein the cap is configured to reduce a tensile stress on the core from the top cladding.

15. A Mach-Zehnder optical waveguide structure having a reduced dn/dt birefringence, comprising:
   an optical core;
   a cap disposed around the optical core;
   a top cladding over the optical core;
   a heater on the top clad above the optical core;
   a bottom cladding beneath the optical core; and
   a silicon substrate, the bottom cladding over the silicon substrate, wherein the top cladding, the bottom cladding, and a portion of the silicon substrate have a first trench and a second trench etched there through parallel to the optical core, wherein the first trench and the second trench extend from an upper surface of the top cladding into a portion of the substrate, the first trench and the second trench configured to relieve a stress on the optical core, thereby reducing dn/dt birefringence.

16. The method of claim 15 wherein the first trench and the second trench are configured to balance a stress within the optical core.

17. The method of claim 15 wherein the cap is configured to reduce a tensile stress on the core from the top cladding.

* * * * *